United States Patent [19]

Yamashita et al.

[11] Patent Number: 5,330,833
[45] Date of Patent: Jul. 19, 1994

[54] TIN OXIDE FIBER AND A PROCESS FOR PRODUCING THE SAME

[75] Inventors: Hiroya Yamashita; Keiko Seki, both of Tokuyama; Sumio Sakka, Hirakata; Toshinobu Yoko, Uji, all of Japan

[73] Assignee: Tokuyama Soda Kabushiki Kaisha, Tokuyama, Japan

[21] Appl. No.: 828,606

[22] Filed: Jan. 31, 1992

[30] Foreign Application Priority Data

Jul. 24, 1991 [JP] Japan .................. 3-185541
Oct. 24, 1991 [JP] Japan .................. 3-278080
Oct. 29, 1991 [JP] Japan .................. 3-283303
Oct. 31, 1991 [JP] Japan .................. 3-286663

[51] Int. Cl.$^5$ .................................. D02G 3/00
[52] U.S. Cl. ................................. 428/364; 428/357; 428/401; 428/384; 264/204; 264/211.11; 423/618; 423/593; 252/518; 501/134; 502/352
[58] Field of Search ............. 428/359, 364, 401, 384; 501/134; 502/352; 257/518; 264/204, 211.11; 423/593, 618

[56] References Cited

U.S. PATENT DOCUMENTS

| | | | |
|---|---|---|---|
| 2,585,341 | 2/1952 | Mochel | 501/134 |
| 3,311,689 | 3/1967 | Kelsey | 501/134 |
| 4,045,949 | 9/1977 | Paton et al. | 428/359 |
| 4,377,409 | 3/1983 | Ishibe | 428/359 |
| 4,623,424 | 11/1986 | Uchida et al. | 423/618 |
| 4,725,331 | 2/1988 | Uchida et al. | 423/618 |
| 4,792,478 | 12/1988 | Taylor et al. | 428/364 |
| 4,880,703 | 11/1989 | Sukamoto et al. | 428/401 |

FOREIGN PATENT DOCUMENTS 1312716 4/1973 United Kingdom .

Primary Examiner—Patrick J. Ryan
Assistant Examiner—N. Edwards
Attorney, Agent, or Firm—Sherman and Shalloway

[57] ABSTRACT

A tin oxide fiber expressed by the general formula $$Sn_{(1-y)}Z_yO_2 \qquad (I)$$

wherein Z is a metal element of the Group V of the periodic table, and y is 0 to 0.3, having a diameter which is greater than 1 μm or having a length which is greater than 3 mm and having an aspect ratio which is greater than 10.

This fiber is process for producing a tin oxide fiber comprising spinning an alcohol solution of a tin compound soluble in alcohol, or spinning an alcohol solution of said tin compound and a compound of a metal of the Group V of the periodic table that is soluble in alcohol, followed by heating.

2 Claims, No Drawings

TIN OXIDE FIBER AND A PROCESS FOR PRODUCING THE SAME

BACKGROUND OF THE INVENTION

1. Field of the Invention

The present invention relates to a novel tin oxide fiber and a process for producing the same. More specifically, the present invention relates to a novel tin oxide fiber having a diameter which is greater than 1 μm or having a length which is greater than 3 mm and having an aspect ratio which is greater than 10, and to a process for producing the same.

2. Prior Art

A tin oxide fiber has been widely known. Being limited by the process of production, however, the tin oxide fibers that have been known so far all have diameters which are smaller than 1 μm. It has been demanded to develop a tin oxide fiber having a large diameter and an increased length to meet a variety of applications. However, a technology that satisfies the above demand has not yet been developed.

In the field of gas sensors, it has been strongly desired to provide the tin oxide in the form of a fiber from the standpoint of improving sensitivity and response time. It has further been attempted to add a carbon fiber or the like in order to give electric conductivity to the high molecular materials. When carbon is used, however, there arise a problem in that the black color of carbon makes it difficult to obtain materials in bright colors. Therefore, it has been attempted to add a metal fiber or the powder of a metal oxide. However, the metal fiber which has a high electric conductivity permits the fiber surfaces to be oxidized or corroded after long periods of time and decreases electric conductivity. Moreover, a conventional metal oxide powder does not have electric conductivity that is as high as that of the metal fibers, and must be added in relatively large amounts to give electric conductivity to the high molecular materials, causing the properties inherent in the high molecular materials to be deteriorated. Attempts have further been made to add the tin oxide having excellent resistance against the chemicals and the heat in the form of a powder. Here, it has been known that the effect for giving electric conductivity increases with an increase in the aspect ratio of the electric conductivity-imparting material. It has therefore been demanded to provide the tin oxide having high electric conductivity in the form of a fiber.

The tin oxide fibers have heretofore been obtained exclusively by the so-called melt-precipitation method according to which the starting material of tin compound is melted at high temperatures in order to precipitate the tin oxide fiber. Japanese Patent Laid-Open Nos. 54997/1985 and 161337/1985 teach tin oxide fibers having a diameter of 0.5 μm and a maximum length of 3 mm obtained by the above melt-precipitation method.

The above methods, however, require a reaction temperature which is higher than 1000° C. and a reaction time of several days. In addition, the obtained fiber has a diameter that is so small that the handling becomes difficult. When used as a composite material, therefore, the functions are not sufficiently exhibited and the applications are restricted. Moreover, the length is so small that paper-like materials cannot be prepared therefrom.

Description of the Invention

It is therefore an object of the present invention to provide a tin oxide fiber having a large diameter and an increased length and a process for producing the same.

Another object of the present invention is to provide a technology of producing a tin oxide fiber from a starting material that is industrially cheaply available through a simple process.

Further objects of the present invention will become obvious from the following description.

In order to accomplish the above objects, the present inventors have conducted keen study, and have astonishingly discovered the fact that a tin oxide fiber having any aspect ratio can be obtained easily and very stably by using tin compounds instead of using the traditionally employed starting material of tin alkoxide that is expensive, unstable and is cumbersome to handle, and have arrived at the present invention.

That is, the present invention provides a novel tin oxide fiber represented by a general formula (I), $$Sn_{(1-y)}Z_yO_2 \qquad (I)$$

wherein Z is a metal element of the Group V of the periodic table, and y is 0 to 0.3, having a diameter which is greater than 1 μm, or having a length which is greater than 3 mm, and having an aspect ratio which is greater than 10.

The present invention further provides a process for producing a novel tin oxide fiber comprising spinning an alcohol solution of a tin compound soluble in alcohol, or spinning an alcohol solution of said tin compound and a compound of a metal of the Group V of the periodic table that is soluble in alcohol.

The tin oxide fiber provided by the present invention is a compound having a composition represented by the above general formula (I). The metal element of the Group V of the periodic table denoted by Z in the above general formula (I) is a component that is added to increase the electric conductivity of the fiber of $SnO_2$. The component Z is contained in the $SnO_2$ of the present invention in the form of a solid solution and contributes to improving the electric conductivity. The component Z that is contained in an increased amount does not all exist in the form of a solid solution but is contained being partly mixed with the $SnO_2$. Generally, the component Z is contained in the $SnO_2$ in the form of a solid solution in an amount of up to about y=0.15. As the fraction y becomes 0.20 or greater, however, the component Z is partly contained in the form of a mixture in addition to the component that is contained in the $SnO_2$ in the form of a solid solution. Even when the component Z is contained partly as a mixture, the object of improving the electric conductivity can be sufficiently achieved when the fraction y of the component Z is smaller than 0.3. The component Z contained in the tin oxide fiber of the present invention in the form of a solid solution can be confirmed by the fluorescent X-ray analysis and by the fact that there is no peak of component Z by the X-ray diffraction.

The tin oxide fiber of the present invention that is represented by the general formula (I) can be sufficiently confirmed by the fluorescent X-ray analysis and X-ray diffraction. When more accurate composition is required, the elemental analysis should be carried out. Even in the tin oxide fiber of the present invention, however, there exist oxygen deficiencies as would often happen in other oxides, and the number of deficiencies vary to some extent as a matter of course.

As will be described later in detail, the tin oxide fiber of the present invention can be easily obtained by the spinning method having any diameter, length of the fiber and aspect ratio. Generally, the tin oxide fiber has a diameter greater than 1 μm, preferably 5 to 500 μm, has a length than 3 mm, preferably longer than 1 cm, and has an aspect ratio of greater than 10, preferably greater than 50, and more preferably greater than 100. It is, however, also allowable to produce those fibers having a diameter smaller than 1 μm and a length greater than 3 mm or those fibers having a length of 0.5 mm to 3 mm and a diameter of greater than 1 μm, depending upon the applications. By changing the spinning conditions, in particular, the fiber can be obtained having a diameter of 1 μm or greater. Moreover, the length of the fiber can be increased to as long as desired by continuously winding it.

The tin oxide fiber of the present invention is a compound having an electrically conductive property. When the component denoted by Z in the above general formula is not made present, the electric resistivity ranges from about $1 \times 10^3$ ohm-cm to about $1 \times 10^5$ ohm-cm. When the component Z of the general formula (I) is contained in the form of a solid solution, the electric resistivity can be improved to $1 \times 10^{-2}$ ohm-cm or further to $1 \times 10^{-3}$ ohm-cm. In order to enhance the electric conductivity, therefore, the component Z of the general formula (I) should preferably be added in an amount of the fraction $y=0.3$ at the greatest. The greatest effect is exhibited when the component Z is added in an amount of the fraction $y=0.15$ or up to about $Y=0.20$ in which it is contained in the $SnO_2$ in the form of a solid solution.

There is no particular limitation on the metal elements of the Group V of the periodic table denoted by Z in the above general formula (I), and any of vanadium, niobium, tantalum, antimony or bismuth can be used. From the standpoint of improving the electric conductivity, however, antimony (Sb), is most desired and, then, tantalum (Ta) or niobium (Nb) is desired. Therefore the compound $Sn_{(1-y)}Sb_yO_2$ is most desired and then the compounds $Sn_{(1-y)}Ta_yO_2$ and $Sn_{(1-y)}Nb_yO_2$ (y is 0 to 0.3 in all cases) are desired.

Though there is no particular limitation on the process of production, the tin oxide fiber of the present invention can be produced by the spinning method described below. That is, the tin oxide fiber is produced by spinning an alcohol solution of a tin compound soluble in alcohol or by spinning an alcohol solution of the above tin compound and a compound of a metal of the Group V of the periodic table that is soluble in alcohol.

Though there is no particular limitation on the alcohol that is used in the above process, the alcohol represented by a general formula ROH is preferably used, in which R is a unsubstituted or a substituted alkyl group such as methyl group, ethyl group, propyl group, butyl group or octyl group, or is a unsubstituted or a substituted alkenyl group such as vinyl group, allyl group or butenyl group. In addition to the above-mentioned examples, concrete examples of the substituent group in the above substituted alkyl group and the substituted alkenyl group include an alkoxyl group such as methoxy group, ethoxy group, etc.; a hydroxyl group; a hydroxyalkyl group; an aryl group such as phenyl group, etc.; an alkyl group such as methyl group, ethyl group, etc.; an amino group; a cyano group; and a halogen atom such as chlorine atom, bromine atom, iodine atom, fluorine atom.

Concrete examples of the alcohol include a methyl alcohol, ethyl alcohol, propyl alcohol, butyl alcohol, octyl alcohol, 2-methoxyethanol, 2-ethoxyethanol, ethylene glycol, 1-methoxy-2-propyl alcohol, ethoxymethoxyethanol, 2-phenylethyl alcohol, benzyl alcohol, allyl alcohol, 2-methyl-2-proprene-1-ol, 3-methyl-3-butene-1-ol, phenol, methoxyphenol, ethoxyphenol, cresol, ethylphenol and the like.

In particular, methyl alcohol and ethyl alcohol are desired because of their high capabilities of solubilizing the tin compound. The alcohol is usually used alone, but it is also allowable to use two or more kinds of alcohols being mixed together to control the reactivity to the tin compound or to control the solubility of the tin compound.

Any tin compound which is the starting material for obtaining the tin oxide fiber of the present invention can be used without any particular limitation provided it is soluble in the above-mentioned alcohols. A tin compound in which tin exhibits two valences is preferred for obtaining the longer tin oxide fiber. The alcohol-soluble tin compound which is available most cheaply is a halogenated tin compound. Particularly suited examples include tin chloride and tin bromide such as $SnCl_2$, $SnBr_2$, $SnCl_2 \cdot 2H_2O$, etc.

There is no particular limitation on the ratio of blending the tin compound and alcohol together provided the tin compound is uniformly dissolved in alcohol. When the ratio of the tin compound is too small, however, no spinnability is exhibited and the mixture must be condensed resulting in the waste of alcohol. When the concentration of tin compound is too high, on the other hand, precipitation takes place making it difficult to obtain a homogeneous spinning solution. Therefore, though the blending ratio varies depending upon the kinds of the tin compound and alcohol that are used, it is generally preferred that the tin compound is used at a molar ratio of 0.02 to 0.5 with respect to the alcohol.

In order to improve the stability of the spinning solution, furthermore, it is allowable to additionally use a compound having two or more carbonyl groups such as acetylacetone, ethyl acetoacetate or diethyl malonate. In order to adjust the viscosity, furthermore, an organic high molecular substance can be added such as polyethylene oxide, polyvinyl alcohol or the like.

There is no particular limitation on the compound of a metal of the Group V of the periodic table that is added to improve the electric conductivity of the $SnO_2$ fiber of the present invention, and any known metal compound can be used. Examples of the compound of the metal of the Group V that can be preferably used include a vanadium compound, niobium compound, tantalumn compound, antimony compound and bismuth compound. Among them, the antimony compound is most preferred and, then, the tantalum compound and niobium compound are preferred. There is no particular limitation on these compounds provided they are soluble in the alcohol. The most preferred examples include halides such as chlorides and bromides, and alkoxy compounds such as methoxy, ethoxy, propoxy and the like.

When it is desired to give electric conductivity to the tin oxide fiber, the compound of the Group V should be added at a ratio of smaller than $y=0.3$ and, preferably, at a ratio of $y=0.001$ to $y=0.25$ with respect to the tin oxide reckoned as an oxide. When the above ratio is too small, the tin oxide fiber that is obtained exhibits low electric conductivity. Even when the above ratio is more increased, on the other hand, the electric conductivity is not given too much.

There is no particular limitation on the method of dissolving the tin compound and the compound of the Group V in the alcohol; i.e., alcohol may be dropped on the tin compound and the compound of the Group V, or the tin compound and the compound of the Group V may be dissolved in the alcohol with stirring.

It is further allowable to suitably use an acid such as hydrochloric acid, nitric acid or acetic acid, a compound having a carbonyl group such as acetylacetone, and ammonia as a catalyst and a complexing agent.

There is no particular limitation on the method of spinning and any conventional spinning method can be employed. For instance, there can be employed a method in which a spinning solution is extruded into the open air from the spinning nozzle. The length and diameter of the obtained fiber can be arbitrarily controlled by adjusting the viscosity of the spinning solution or the velocity at which the spinning solution is extruded from the spinning nozzle, and the relative humidity at the time of spinning plays an important role in determining the spinnability. For example, when the atmosphere in which the spun fiber comes in contact has a high relative humidity, it becomes difficult to obtain a fiber having large diameters and to spin a fiber having increased length. In order to stably spin a fiber having any aspect ratio and, particularly, having a length of greater than 2 m, therefore, it is desired to maintain the relative humidity of the atmosphere in which the fiber comes in contact to be smaller than 40%. Although it is possible to spin the fiber even when the relative humidity is greater than 40%, it becomes difficult to stably spin the fiber having a length greater than 2 m and, particularly, to stably spin the continuous fibers. The present inventors are not sure about the reasons but presume as mentioned below. That is, when the atmosphere has a high relative humidity, the alcohol and water contained in the spun gel fiber vaporize sparingly, and the gel fiber is not quickly solidified and does not acquire stabilized shape. Moreover, because of its high water absorbing property and deliquescent property, the gel fiber becomes soft as soon as it comes in contact with the atmosphere of a high relative humidity. It is therefore important to maintain the relative humidity to be lower than 40%.

The gel fiber obtained without heat-treatment does not exhibit high electric conductivity. High electric conductivity is attained often the gel fiber is heat-treated. There is no particular limitation on the temperature of the heat treatment provided it lies within a range to give electric conductivity to the fiber. When the temperature of the heat treatment is low, in general, organic material such as alcohol and water remain in the gel fiber, and the compound of the Group V is not converted into an oxide and is not sufficiently contained in the tin oxide in the form of a solid solution. Therefore, the high electric conductivity is not exhibited. When the temperature of the heat treatment is too high, on the other hand, the compound of the Group V escapes from the fiber causing the electric conductivity to decrease, decomposition of the tin oxide is promoted, and crystalline particles grow excessively in the fiber causing the strength to decrease. In general, the temperature of the heat treatment ranges from 150° C. to 1550° C., and tin oxide fiber is crystalized preferably over a temperature range of 250° C. to 1550° C. More preferably, the heat treatment should be carried out at a temperature of 300° C. to 1500° C. The heat treatment is usually carried out in the air. When it is desired to obtained a fiber having high electric conductivity, in particular, the heat treatment should be carried out in a reducing atmosphere such as of nitrogen, argon, hydrogen, or a mixture gas of argon and hydrogen, or in vacuum.

In order to obtain a fiber having good electric conductivity, furthermore, it is desired to remove volatile components such as water and alcohol present in the gel fiber by drying. The drying may be carried out simultaneously with the heat treatment. To obtain a fiber having good electric conductivity, however, it is desired to dry a fiber prior to the heat treatment. In the case of the continuously spinning method, the drying step is placed preceding the step of heat treatment. It is desired that the drying is carried out at a temperature as low as possible so that cracks will not develop in the fiber that is obtained. When an alcohol having a high boiling point is used as a solvent, however, an extended period of time is required for the drying if the drying temperature is too low. In general, the drying should desirably be carried out at a temperature over a range of room temperature to 300° C.

The tin oxide fiber of the present invention assumes either the crystalline form or the noncrystalline form depending upon the temperature of the heat treatment. When it is desired to obtain a tin oxide fiber having good electric conductivity, the heat treatment should be carried out at a high temperature to obtain the tin oxide fiber in the crystalline form.

According to the present invention as described above, it is allowed to obtain a tin oxide fiber having a controlled diameter and a controlled length. The fiber obtained by the above-mentioned method can be used directly as a raw material for gas sensors, a filler of plastics, etc. As required, furthermore, the tin oxide fiber obtained by the above method can be processed into fibers of suitable sizes by such means as cutting, pulverizing or the like to use them in a variety of applications.

The invention will further be described by way of the following working examples to which, however, the invention is in no way limited.

EXAMPLE 1

10 Grams (0.05 mols) of stanous chloride ($SnCl_2$) was dissolved in 100 ml (2.47 mols) of methanol to obtain a homogeneous solution thereof. The solution was held in a dryer maintained at 40° C. and was concentrated to obtain a sol having high viscosity. The tip of a glass rod was immersed in the sol and was pulled up in an atmosphere of a relative humidity of 55% while manually changing the pull-up speed from about 1 cm/sec. to 10 cm/sec. to spin many gel fibers having lengths of about one meter. The obtained fibers were left to stand at room temperature for one day, heated up to 120° C. at a rate of 2° C./min. and were held at that temperature for 30 minutes. The fibers were then heated up to 500° C. at a rate of 10° C./min. and were held at that temperature for 30 minutes. The obtained fibers possessed diameters over a range of from 1 μm to 2 mm depending upon the pull-up speed, and were confirmed to be comprised of crystalline tin oxide by X-ray analysis.

EXAMPLE 2

13.9 Grams (0.05 mols) of stanous bromide ($SnBr_2$) was dissolved in 100 ml of ethanol to obtain a homogeneous solution thereof. The solution was held in a dryer maintained at 40° C. and was concentrated to obtain a sol having high viscosity. The tip of a glass rod was immersed in the sol and was pulled in an atmosphere of a relative humidity of 55% while variously changing the pull-up speed in the same manner as in Example 1 to spin many gel fibers having lengths of about one meter. The obtained fibers were left to stand at room temperature for one day, heated up to 120° C. at a rate of 2° C./min. and were held at that temperature for 30 minutes. The fibers were then heated up to 500° C. at a rate of 10° C./min. and were held at that temperature for 30 minutes to effect the heat treatment. The obtained fibers possessed diameters over a range of from 1 μm to 2 mm depending upon the pull-up speed, and were confirmed to be comprised of crystalline tin oxide as a result of X-ray analysis.

EXAMPLE 3

11.3 grams (0.05 mols) of stanous chloride dihydrate ($SnCl_2 \cdot 2H_2O$) was dissolved in 100 ml (2.47 moles) of methanol to obtain a homogeneous solution thereof. The solution was held in a dryer maintained at 40° C. and was concentrated to obtain a sol having high viscosity. The tip of a glass rod was immersed in the sol and was pulled up in an atmosphere of a relative humidity of 55% while variously changing the pull-up speed in the same manner as in Example 1 to spin many gel fibers having lengths of about one meter. The obtained fibers were left to stand at room temperature for one day, heated up to 120° C. at a rate of 2° C./min. and were held at that temperature for 30 minutes. Then, the fibers were heated up to 500° C. at a rate of 10° C./min. and were held at that temperature for 30 minutes to effect the heat treatment. The obtained fibers possessed diameters over a range of from 1 μm to 2 mm depending upon the pull-up speed, and were confirmed to be comprised of crystalline tin oxide as a result of X-ray analysis.

EXAMPLES 4 TO 10

The procedure was carried out in the same manner as in Example 1 with the exception of using a variety of alcohols instead of methanol. A rotary evaporator was used to concentrate the solution.

The results were shown in Table 1.

EXAMPLES 11 AND 12

The procedure was carried out in the same manner as in Example 1 with the exception of setting the relative humidity in the spinning atmosphere to be 40% and 10%. The results were shown in Table 1.

EXAMPLE 13

The procedure was carried out in the same manner as in Example 1 with the exception of changing the temperature of the heat treatment from 500° C. to 180° C. The results were shown in Table 1.

TABLE 1

| Example No. | Kind of alcohol | Humidity (%) | Heat-treating temperature (°C.) | Diameter of fiber | Length of fiber (m) | Results of X-ray diffraction |
|---|---|---|---|---|---|---|
| 4 | 2-methyl-2-propene-1-ol | 55 | 500 | 1 μm to 2 mm | 1 | crystalline |
| 5 | 3-methyl-3-butene-1-ol | " | " | " | " | " |
| 6 | 2-ethoxyethanol | " | " | " | " | " |
| 7 | 1-methoxy-2-propanol | " | " | " | " | " |
| 8 | ethylene glycol | " | " | " | " | " |
| 9 | benzyl alcohol | " | " | " | " | " |
| 10 | 2-methoxyethanol | " | " | " | " | " |
| 11 | methanol | 40 | " | " | 2 to 3 | " |
| 12 | methanol | 10 | " | " | 3 to 4 | " |
| 13 | methanol | 55 | 180 | " | 1 | amorphous |

EXAMPLE 14

10 grams (0.05 mols) of stanous chloride ($SnCl_2$) and 1 g (0.004 mols) of antimony trichloride ($SbCl_3$) were dissolved in 100 ml (2.47 mols) of methanol to obtain a homogeneous solution thereof. The solution was held in a dryer maintained at 40° C. and was concentrated to obtain a sol having high viscosity. The tip of a glass rod was immersed in the sol and was pulled up in an atmosphere of a relative humidity of 55% while variously changing the pull-up speed to spin many gel fibers having lengths of about one meter. The obtained fibers were left to stand at room temperature for one day, heated to 120° C. at a rate of 2° C./min. and were held at that temperature for 30 minutes. The fibers were then heated up to 500° C. at a rate of 10° C./min. and were held at that temperature for 30 minutes to effect the heat treatment. The obtained fibers possessed diameters over a range of from 1 μm to 2 mm depending upon the pull-up speed, and were confirmed by the fluorescent X-ray analysis to contain antimony in the fibers in amounts in compliance with the feeding composition. By X-ray diffraction, no peaks were found except those that correspond to the tin oxide, from which it was confirmed that antimony had been contained in the tin oxide in the form of a solid solution. The fibers exhibited resistivity of about $8 \times 10^{-1}$ ohm-cm.

EXAMPLE 15

13.9 Grams (0.05 mols) of stanous bromide ($SnBr_2$) and 1 g (0.004 mols) of antimony trichloride ($SbCl_3$) were dissolved in 100 ml (2.47 moles) of methanol to obtain a homogeneous solution thereof. The solution was held in a dryer maintained at 40° C. and was concentrated to obtain a sol having high viscosity. The tip of a glass rod was immersed in the sol and was pulled up in an atmosphere of a relative humidity of 55% while variously changing the pull-up speed to spin many gel fibers having lengths of about one meter. The obtained fibers were left to stand at room temperature for one day, heated up to 120° C. at a rate of 2° C./min. and were held at that temperature for 30 minutes. The fibers were then heated up to 500° C. at a rate of 10° C./min. and were held at that temperature for 30 minutes to effect the heat treatment. The obtained fibers possessed diameters of from 1 μm to 2 mm depending upon the pull-up speed, and were confirmed to be comprised of crystalline tin oxide in which antimony had been contained in the form of a solid solution as a result of fluorescent X-ray analysis and X-ray diffraction. The fibers exhibited a resistivity of $8 \times 10^{-1}$ ohm-cm.

EXAMPLES 16 TO 44

The procedure was carried out by changing the tin compound, alcohol, kind of compound of the Group V of the periodic table, humidity at the time of spinning and the temperature of the heat treatment. The results were as shown in Table 2. When alcohols other than methanol and ethanol were used, however, the solutions were concentrated by using a rotary evaporator.

TABLE 2

| Example No. | Sn compound | Alcohol | Group V compound | Humidity | Heat-treating temperature | Diameter of fiber | Length of fiber | X-ray diffraction | Resistivity |
|---|---|---|---|---|---|---|---|---|---|
| 16 | SnCl$_2$.2H$_2$O 0.05 mols | methanol | SbCl$_3$ 0.004 mols | 55% | 500° C. | 1 μm to 2 mm | 1 m | solid solution crystalline | $8 \times 10^{-1}$ ohm-cm |
| 17 | SnCl$_2$ 0.05 mols | ethanol | Sb(OC$_2$H$_5$)$_5$ 0.004 mols | 55% | 500° C. | 1 μm to 2 mm | 1 m | solid solution crystalline | $8 \times 10^{-1}$ ohm-cm |
| 18 | SnCl$_2$ 0.05 mols | 2-methyl-2-propene-1-ol | SbCl$_3$ 0.004 mols | 55% | 500° C. | 1 μm to 2 mm | 1 m | solid solution crystalline | $8 \times 10^{-1}$ ohm-cm |
| 19 | SnCl$_2$ 0.05 mols | 3-methyl-3-butene-1-ol | SbCl$_3$ 0.004 mols | 55% | 500° C. | 1 μm to 2 mm | 1 m | solid solution crystalline | $8 \times 10^{-1}$ ohm-cm |
| 20 | SnCl$_2$ 0.05 mols | 2-methoxy-ethanol | SbCl$_3$ 0.004 mols | 55% | 500° C. | 1 μm to 2 mm | 1 m | solid solution crystalline | $8 \times 10^{-1}$ ohm-cm |
| 21 | SnCl$_2$ 0.05 mols | 2-ethoxy-ethanol | SbCl$_3$ 0.004 mols | 55% | 500° C. | 1 μm to 2 mm | 1 m | solid solution crystalline | $8 \times 10^{-1}$ ohm-cm |
| 22 | SnCl$_2$ 0.05 mols | 1-methoxy-2-propanol | SbCl$_3$ 0.004 mols | 55% | 500° C. | 1 μm to 2 mm | 1 m | solid solution crystalline | $8 \times 10^{-1}$ ohm-cm |
| 23 | SnCl$_2$ 0.05 mols | ethylene glycol | SbCl$_3$ 0.004 mols | 55% | 500° C. | 1 μm to 2 mm | 1 m | solid solution crystalline | $8 \times 10^{-1}$ ohm-cm |
| 24 | SnCl$_2$ 0.05 mols | benzyl alcohol | SbCl$_3$ 0.004 mols | 55% | 500° C. | 1 μm to 2 mm | 1 m | solid solution crystalline | $8 \times 10^{-1}$ ohm-cm |
| 25 | SnCl$_2$ 0.05 mols | methanol | TaCl$_5$ 0.0025 mols | 55% | 500° C. | 1 μm to 2 mm | 1 m | solid solution crystalline | $8 \times 10^{2}$ ohm-cm |
| 26 | SnCl$_2$ 0.05 mols | methanol | Nb(OC$_2$H$_5$)$_5$ 0.0025 mols | 55% | 500° C. | 1 μm to 2 mm | 1 m | solid solution crystalline | $8 \times 10^{2}$ ohm-cm |
| 27 | SnCl$_2$ 0.05 mols | methanol | none | 55% | 500° C. | 1 μm to 2 mm | 1 m | solid solution crystalline | $8 \times 10^{4}$ ohm-cm |
| 28 | SnBr$_2$ 0.05 mols | 2-methoxy-ethanol | Sb(OCH$_3$)$_3$ 0.004 mols | 55% | 500° C. | 1 μm to 2 mm | 1 m | solid solution crystalline | $8 \times 10^{-1}$ ohm-cm |
| 29 | SnBr$_2$ 0.05 mols | ethylene glycol | SbCl$_3$ 0.004 mols | 55% | 500° C. | 1 μm to 2 mm | 1 m | solid solution crystalline | $8 \times 10^{-1}$ ohm-cm |
| 30 | SnCl$_2$.2H$_2$O 0.05 mols | 2-ethoxy-ethanol | SbCl$_3$ 0.004 mols | 55% | 500° C. | 1 μm to 2 mm | 1 m | solid solution crystalline | $8 \times 10^{-1}$ ohm-cm |
| 31 | SnCl$_2$.2H$_2$O 0.05 mols | 2-methyl-2-propene-1-ol | SbCl$_3$ 0.004 mols | 55% | 500° C. | 1 μm to 2 mm | 1 m | solid solution crystalline | $8 \times 10^{-1}$ ohm-cm |
| 32 | SnCl$_2$ 0.05 mols | methanol | SbCl$_3$ 0.004 mols | 20% | 500° C. | 1 μm to 2 mm | 2 to 3 m | solid-solution crystalline | $8 \times 10^{-1}$ ohm-cm |
| 33 | SnBr$_2$ 0.05 mols | methanol | SbCl$_3$ 0.004 mols | 20% | 500° C. | 1 μm to 2 mm | 2 to 3 m | solid-solution crystalline | $8 \times 10^{-1}$ ohm-cm |
| 34 | SnCl$_2$ 0.05 mols | methanol | SbCl$_3$ 0.004 mols | 10% | 500° C. | 1 μm to 2 mm | 3 to 4 m | solid-solution crystalline | $8 \times 10^{-1}$ ohm-cm |
| 35 | SnCl$_2$ 0.05 mols | methanol | SbCl$_3$ 0.004 mols | 40% | 500° C. | 1 μm to 2 mm | 2 to 3 m | solid-solution crystalline | $8 \times 10^{-1}$ ohm-cm |
| 36 | SnBr$_2$ 0.05 mols | ethanol | SbCl$_3$ 0.004 mols | 20% | 500° C. | 1 μm to 2 mm | 2 to 3 m | solid-solution crystalline | $8 \times 10^{-1}$ ohm-cm |
| 37 | SnBr$_2$ 0.05 mols | ethanol | Ta(OC$_2$H$_5$)$_5$ 0.0025 mols | 20% | 500° C. | 1 μm to 2 mm | 2 to 3 m | solid-solution crystalline | $8 \times 10^{-1}$ ohm-cm |

TABLE 2-continued

| Example No. | Sn compound | Alcohol | Group V compound | Humidity | Heat-treating temperature | Diameter of fiber | Length of fiber | X-ray diffraction | Resistivity |
|---|---|---|---|---|---|---|---|---|---|
| 38 | $SnCl_2$ 0.05 mols | methanol + polyethylene glycol 1 g | $SbCl_3$ 0.004 mols | 40% | 500° C. | 1 μm to 2 mm | 3 m | solid solution crysalline | $8 \times 10^{-1}$ ohm-cm |
| 39 | $SnCl_2$ 0.05 mols + $Si(OCH_3)_4$ 0.01 mol | methanol | $SbCl_3$ 0.004 mols | 40% | 500° C. | 1 μm to 2 mm | 3 m | solid solution crysalline | $5 \times 10^1$ ohm-cm |
| 40 | $SnBr_2$ 0.05 mols | ethanol | $NbCl_5$ 0.0005 mols | 40% | 500° C. | 1 μm to 2 mm | 2 to 3 m | solid solution crysalline | $7 \times 10^3$ ohm-cm |
| 41 | $SnBr_2$ | ethanol | $SbCl_3$ 0.001 mol | 40% | 500° C. | 1 μm to 2 mm | 2 to 3 m | solid solution crysalline | $2 \times 10^1$ ohm-cm |
| 42 | $SnCl_2$ 0.05 mols | methanol + polyvinyl | $SbCl_3$ 0.004 mols | 10% | 500° C. | 1 μm to 2 mm | 4 to 5 m | solid solution crysalline | $8 \times 10^{-1}$ ohm-cm |
| 43 | $SnCl_2$ 0.05 mols | methanol | $SbCl_3$ 0.005 mols | 40% | 500° C. | 1 μm to 2 mm | 3 to 4 m | solid solution crysalline | $1 \times 10^{-2}$ ohm-cm |
| 44 | $SnCl_2$ 0.05 mols | methanol | $SbCl_3$ 0.015 mols | 10% | 500° C. | 1 μm to 2 mm | 3 to 4 m | crystalline, peak parly due to $Sb_2O_5$ | $9 \times 10^{-1}$ ohm-cm |

EXAMPLE 45

The procedure was carried out in the same manner as in Example 14 with the exception of rotation-spinning the spinning solution from an orifice 0.5 mm in diameter at a relative humidity of 55% at a speed of 2000 rpm. The obtained gel fiber of a length of about one meter was heat-treated. The diameter was about 15 μm. It was confirmed through the fluorescent X-ray analysis that antimony was contained in the fiber in an amount in compliance with the feeding composition.

As a result of X-ray diffraction, furthermore no peak was found except the peak that corresponds to the tin oxide from which it was confirmed that antimony had been contained in the tin oxide in the form of a solid solution.

The obtained fiber exhibited a resistivity of about $8 \times 10^{-1}$ ohm-cm.

We claim:
1. A tin oxide fiber having a composition expressed by the general formula

$$Sn_{1-y}Z_yO_2$$

wherein Z is a metal element of Group V of the periodic table, and y is 0.001 to 0.25, and having (i) a diameter of 5 to 500 μm, (ii) a length which is greater than 1 cm, (iii) an aspect ratio which is greater than 50, and (iv) an electrical resistivity of $1 \times 10^{-3}$ ohm-cm to $1 \times 10^5$ ohm-cm; said fiber being prepared by spinning a solution of a divalent tin compound soluble in an alcohol and a compound of a metal of Group V of the periodic table which is soluble in an alcohol, and then heat-treating the spun fiber.

2. A tin oxide fiber according to claim 1, wherein the tin oxide is a crystalline substance.

* * * * *